United States Patent
MacDonald et al.

(10) Patent No.: US 9,648,455 B2
(45) Date of Patent: May 9, 2017

(54) METHOD FOR OPTIMIZING MOBILE DEVICE REGION MONITORING AND REGION MANAGEMENT FOR AN ANONYMOUS MOBILE DEVICE

(71) Applicant: Ping4 Inc., Nashua, NH (US)

(72) Inventors: Rindress MacDonald, Hollis, NH (US); Tatsuki Nakano, Nashua, NH (US); Sett Paing Oo, Nashua, NH (US); Dan Post, Tewksbury, MA (US); Sean Roy, Stratham, NH (US); Mark Sexton, Merrimack, NH (US)

(73) Assignee: Ping4 Inc., Nashua, NH (US)

(*) Notice: Subject to any disclaimer, the term of this patent is extended or adjusted under 35 U.S.C. 154(b) by 0 days.

(21) Appl. No.: 15/078,888

(22) Filed: Mar. 23, 2016

(65) Prior Publication Data

US 2016/0286345 A1    Sep. 29, 2016

Related U.S. Application Data

(60) Provisional application No. 62/137,046, filed on Mar. 23, 2015.

(51) Int. Cl.
| | |
|---|---|
| H04W 24/00 | (2009.01) |
| H04W 4/02 | (2009.01) |
| H04W 52/02 | (2009.01) |
| H04W 24/08 | (2009.01) |
| H04L 29/08 | (2006.01) |
| H04L 29/06 | (2006.01) |
| H04W 12/06 | (2009.01) |
| H04W 12/02 | (2009.01) |

(52) U.S. Cl.
CPC .............. *H04W 4/02* (2013.01); *H04L 63/08* (2013.01); *H04L 67/02* (2013.01); *H04W 12/02* (2013.01); *H04W 12/06* (2013.01); *H04W 24/08* (2013.01); *H04W 52/0229* (2013.01)

(58) Field of Classification Search
USPC .............................................. 455/456.1, 574
See application file for complete search history.

(56) References Cited

U.S. PATENT DOCUMENTS

2008/0274752 A1* 11/2008 Houri .................... G01S 5/0252
455/456.1

* cited by examiner

*Primary Examiner* — Joel Ajayi
(74) *Attorney, Agent, or Firm* — Arent Fox LLP

(57) ABSTRACT

A method, apparatus, and computer program product for reducing battery consumption while performing region monitoring. A mobile device requests, from a web server, N regions to be monitored within a circle having a first radius centered at a current location of the mobile device. The mobile device receives at most N closest regions and a second radius, wherein a personal region comprises an area of a circle having the second radius and centered at the current location of the mobile device. The second radius may be the same or different from the first radius. The mobile device monitors an updated location of the mobile device with respect to the previously defined personal region. The mobile device performs region monitoring of the received regions. When it is determined that the mobile device exits the personal region, requesting, from the web server, an update of the regions to be monitored.

18 Claims, 15 Drawing Sheets

METHOD FOR OPTIMIZING MOBILE DEVICE REGION MONITORING AND REGION MANAGEMENT FOR AN ANONYMOUS MOBILE DEVICE

CROSS-REFERENCE TO RELATED APPLICATION

This application claims the benefit of U.S. Provisional Application Ser. No. 62/137,046, entitled "METHOD FOR OPTIMIZING MOBILE DEVICE REGION MONITORING AND REGION MANAGEMENT FOR AN ANONYMOUS MOBILE DEVICE" and filed on Mar. 23, 2015, which is expressly incorporated by reference herein in its entirety.

BACKGROUND

Field

Aspects of the present disclosure relate generally to a mobile device monitoring predefined regions and detecting when the mobile device enters and exits those predefined regions.

Description of the Related Art

The cell phone market is transitioning from 'feature' phones to 'smart' phones. Feature phones primarily allow phone calls and text messages. Smart mobile devices (phones, tables, etc.) allow the functionality of a laptop computer in a smaller mobile device. Smart mobile devices can connect to the Internet either over the cell phone network or by using Wi-Fi connectivity. Smart mobile devices can run small software applications known as apps. Smart mobile devices can be aware of the device location through the use of a Global Positioning System (GPS) chip, cell phone tower triangulation, or a Wi-Fi network location mapping.

Certain applications track the location of the smart mobile device through the use of some or all of the methodologies available to the device. Navigation software applications are an example of one class of applications that track the location of the mobile device with high precision in order to be able to provide detailed turn-by-turn navigation instructions. However, navigation applications also consume a corresponding large amount of the available battery power.

While smart mobile devices can receive emails, containing rich media information, such email is not specific to the location of the mobile device.

As part of the Location Services provided by the mobile operating system on the smart mobile device, the devices are able to identify predefined regions and detect when a mobile device enters or exits those regions. A region is a geographic area defined by a circular area of a specified radius defined around a geographic point (e.g., latitude, longitude), such as a point of interest to the user. The region may be small (on the order of 150 meters) or large (on the order of tens of miles, or larger). The Location Service on the mobile device may be programmed with Regions to monitor. The Location Service on the mobile device has a recommended minimum size for region to be monitored (on the order of 150 meters). Only regions with this radius or larger can be accurately monitored by the Location Service. After establishing regions to monitor, the mobile operating system (OS) will notify a corresponding location based mobile application on the mobile device when the mobile device has entered or exited a region that the application has designated for the mobile OS to monitor. This process is known, e.g., as Region Monitoring.

As with all uses of the mobile OS Location Services, region monitoring can result in significant battery usage. Often, an OS of the mobile device will limit the number of simultaneous regions monitored by the mobile device.

SUMMARY

In an aspect of the disclosure, a method, mobile device, mobile device application, and computer program product are presented that are capable of monitoring geographic regions with precision while consuming very little of the mobile device's battery power. An adaptive and efficient way to manage the regions being monitored by the mobile device with respect to various regions is presented that minimizes the battery usage of the mobile device.

Aspects may further include providing region monitoring in a manner in which the identity of the owner of the smart phone is never known to the system. A username or explicit registration is not required. The user may never be required to enter an email address or phone number. The system, e.g., might not collect the phone Unique Device Identifier (UDID).

Additional aspects may further include virtualizing Region Monitoring, as to scale the number of regions that can be monitored in a way that is optimal to the device, the application, and/or the user of the mobile device.

Additional aspects may further include enabling features to Region Monitoring that are not supported in the mobile device or the Location Services of the mobile operating system.

Additional advantages and novel features of aspects of the present invention will be set forth in part in the description that follows, and in part will become more apparent to those skilled in the art upon examination of the following or upon learning by practice thereof.

DETAILED DESCRIPTION

Figure 1:
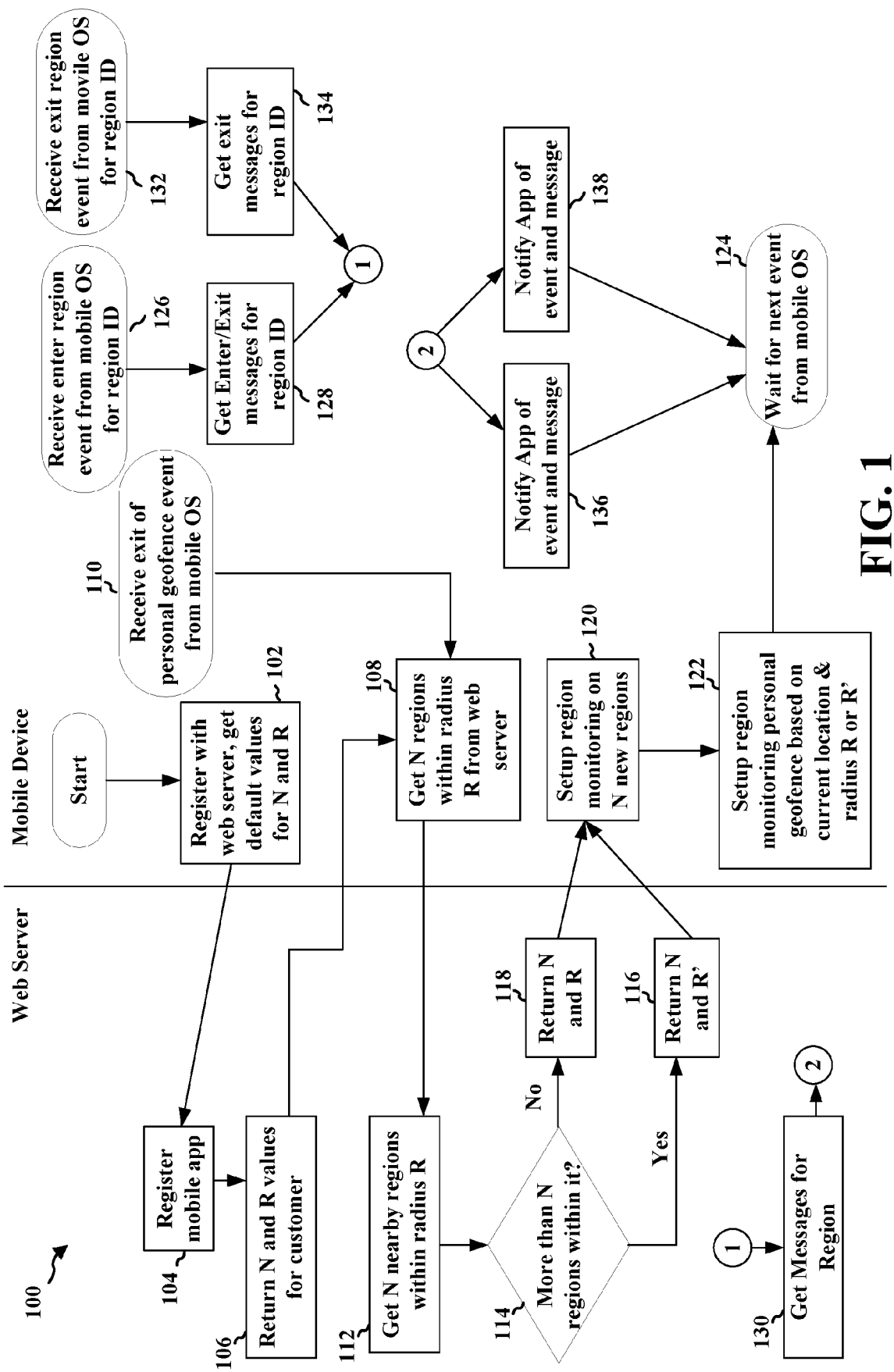
FIG. 1 illustrates a flow chart of an example method of optimizing battery use and maximizing the number of possible regions to be monitored in a mobile device while performing region monitoring, in accordance with aspects of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of optimizing mobile device region monitoring and region management while monitoring geographic regions near the device will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, or any other medium that can be used to carry or store desired program code in the form of instructions or data structures and that can be accessed by a computer. Disk and disc, as used herein, includes CD, laser disc, optical disc, digital versatile disc (DVD), and floppy disk where disks usually reproduce data magnetically, while discs reproduce data optically with lasers. Combinations of the above should also be included within the scope of computer-readable media.

FIG. 1 illustrates a flow chart of an example method 100 of adaptively managing the regions being monitored by a mobile device. The region monitoring of the mobile device may be performed in an anonymous manner, e.g., including aspects described in U.S. patent application Ser. No. 14/145,391, filed on Dec. 31, 2013, titled "System and Method for Anonymous Delivery of Geographically Specific Rich Media Information," the entire contents of which are incorporated by reference herein.

For example, region monitoring may be provided in a manner in which the identity of the owner of the mobile device is never known to the system. A username may not be required. The user may never be required to enter an email address or phone number. The system, e.g., might not collect the phone UDID. The smart phone enables location services on the phone. A registration with a web server provides the SDK with a Globally Unique ID (GUID), which identifies that specific device of that specific mobile application.

Region monitoring may be accomplished using a web service Application Program Interface (API). In one example, a Software Development Kit (SDK) may be provided to enable mobile applications to easily embed the technology to enable the mobile device to efficiently monitor regions. The SDK implements the necessary client-side calls to the web service API as a convenience for client-side implementation.

For example, the user of the smart phone may download and install an application with the SDK or API calls onto the smart phone. The application registers the smart mobile phone with the web service. The web service returns the GUID to the mobile device application, which is then used as a token for mobile device application and web service interaction. Each application on the mobile device using the web service would have its own GUID.

As illustrated in FIG. 1, at 102, the mobile device anonymously registers with a web server to receive default starting values for an initial number of regions to monitor, N, and an initial radius size, R. This registration may be the same registration with the web service that returns the GUID to the mobile device application.

This registration and request allows the mobile device to establish its personal region, which will also be monitored for an exit event. For example, the radius R received from the web server is used as the initial personal region radius to establish the personal region surrounding the mobile device. By creating a personal region for the mobile device, specific location tracking of the mobile device is not required to determine when the mobile device exits the region, in other words, travels beyond the initial radius size, R.

At 104, the web server registers the mobile device, for example, in an anonymous manner. Then, at 106, the web server returns to the mobile device an initial value for the number of regions, N, and an initial value for the radius size, R. The number of regions, N, does not include the personal region of the mobile device. This initial value may be determined by customer preference based on region density or number of anticipated application users, or other determining factors. The values of N and R may be changed at any time through the web server user interface and may be sent to all mobile devices registering with the web server after that point in time.

The number of regions, N, returned may be a result of certain configuration, preferences, filtering, matching, or algorithm-based criteria.

At 108, the mobile device sends a request to the web server, requesting N regions within a radius of R from the mobile device. The request may be, e.g., a request for the N closest regions to the mobile device's location. The regions are regions that have been previously identified, e.g., by adding them through the user interface of the web server specific to individual customers or businesses. The regions may be entered manually by providing latitude, longitude, and region radius values. They may be imported from a Comma Separated Value file. They may be added electronically through a B2B interface or API. Or they may be circular shapes drawn on a map interface provided by the web server. This request may be prompted, e.g., by the receipt of the initial values for N and R from the web server or based on the receipt of a notification relating to a currently monitored region. For example, as illustrated at 110, the mobile device may receive an exit notification from the mobile OS.

In order to effectively manage the mobile device to monitor the closest N regions, the SDK or client-side API calls establish a defined region or a "personal region" around the device. In one example, the client-side API calls may comprise an SDK. The personal region may have a default radius of R, say 25 miles. Periodically, the SDK or client-side API calls within the app on the smart phone device may retrieve a new set of regions to monitor and a new radius less than or equal to the original default personal region radius R. Periodically, the SDK or client-side API calls within the app on the smart phone device may also check the current location of the device to verify that the device is still within the personal region. If the device has left the personal region, the SDK or client-side API calls may communicate with the web server to establish a new personal region with new regions within it to monitor. In this fashion, a new personal region is only established when the mobile device exits the previously established personal region. The personal region remains fixed in place and does not move continuously in lock-step with the mobile device movements. Upon exiting its current personal region, a new one may be established.

For example, an exit event from this personal region can be used to trigger the SDK or client-side API calls to retrieve a new set of N regions closest to the current location of the device. If there are many regions close to the device (where many is a number greater than N) the size of the personal region can be adaptively shrunk to accommodate the N regions. The server returns N regions along with the radius for the new personal region, R'. The SDK or client-side API calls establishes a new personal region with the new radius R'. As the number of nearby regions decreases, on every request for nearby regions the web server dynamically adjusts the size of the personal region adaptively, growing to a maximum radius R.

When the mobile app containing the SDK or client-side API calls is downloaded and installed, the SDK or client-side API calls within the app registers with the web server, retrieves the closest N regions, and establishes a personal region around the mobile device. Whenever the mobile device exits the personal region, the SDK or client-side API calls is notified by the mobile operating system that the personal region has been exited. The SDK or client-side API calls then retrieves a new set of N regions to monitor and establishes a new personal region around the phone. The size of the new personal region is adaptive based on the number of nearby regions returned by the web server.

Thus the mobile device is tuned to adaptively request regions that are nearby to the mobile device, and establish a personal region based on the information that is returned by the web server. As the mobile device moves, the personal region is adaptively resized based on the number of nearby regions, but only when it exits its current personal region, thus conserving battery and eliminating the need to track the specific location and movement of the device. This method efficiently manages the number of regions being monitored by the mobile device as well as the need for the mobile application SDK or client-side API calls to retrieve more regions as the device moves beyond its personal region.

Figure 7:
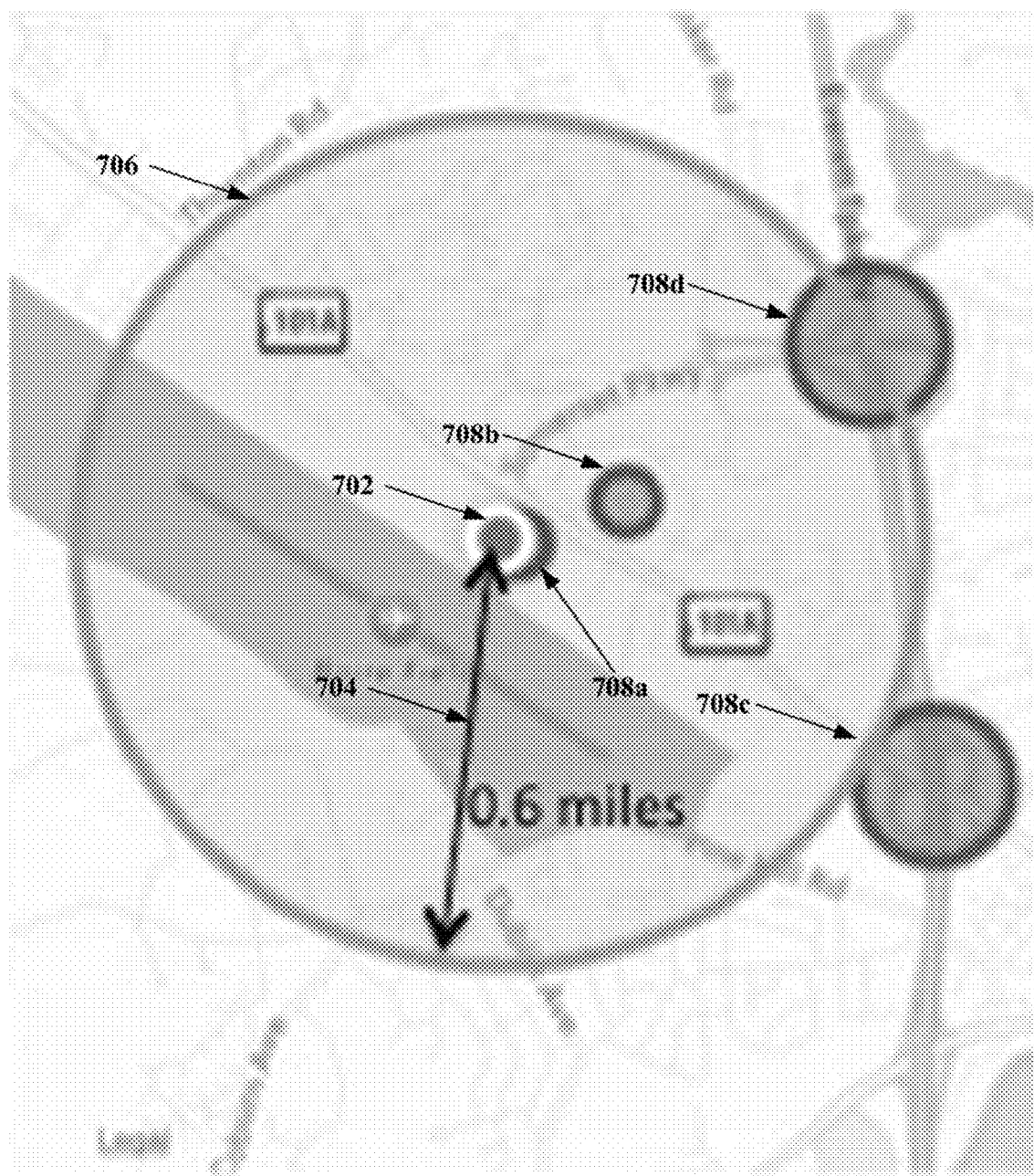
FIGS. 7-10 illustrate examples of adaptively resizing a personal region surrounding the mobile device, in accordance with aspects of the present invention.

FIGS. 7-10 illustrate an example of adaptive resizing of a personal region or a defined region around a mobile device 702. In FIG. 7, a mobile device is illustrated having a personal region 706 of a circle with a radius 704 of 0.6 miles surrounding the mobile device 702. In FIG. 7, four regions of interest 708*a*, 708*b*, 708*c*, 708*d* are illustrated within the personal region 706.

Figure 8:
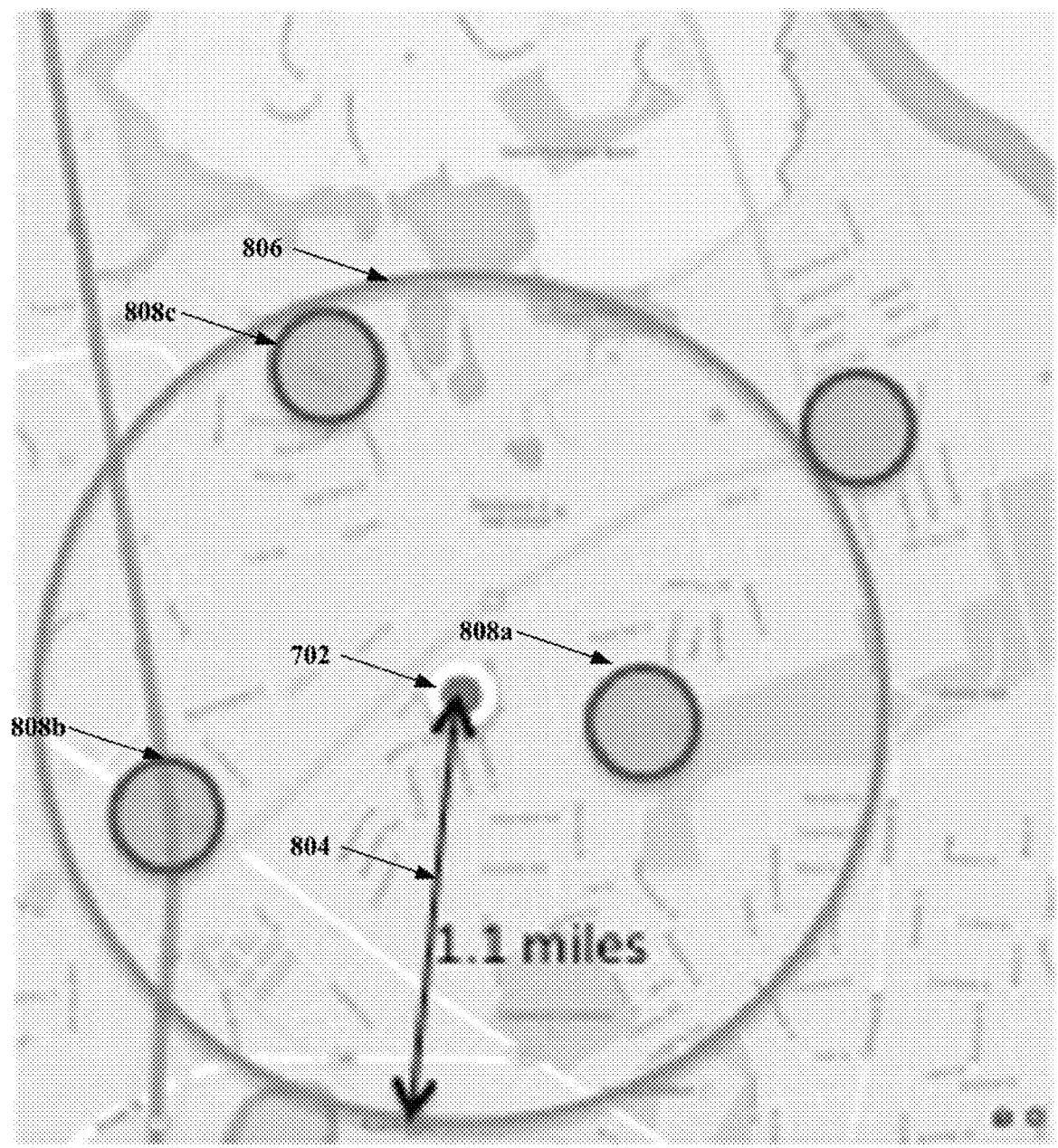

In FIG. 8, the mobile device has moved. Upon exiting the personal region 706, the monitored regions were updated, by the mobile device requesting the closest N regions based on its new location. In FIG. 8, three regions 808*a*, 808*b*, 808*c* were returned along with a personal radius 804 of 1.1 miles. Thus, the new personal region 806 is adjusted to a circle having a radius of 1.1 miles surrounding the mobile device 702.

Figure 9:
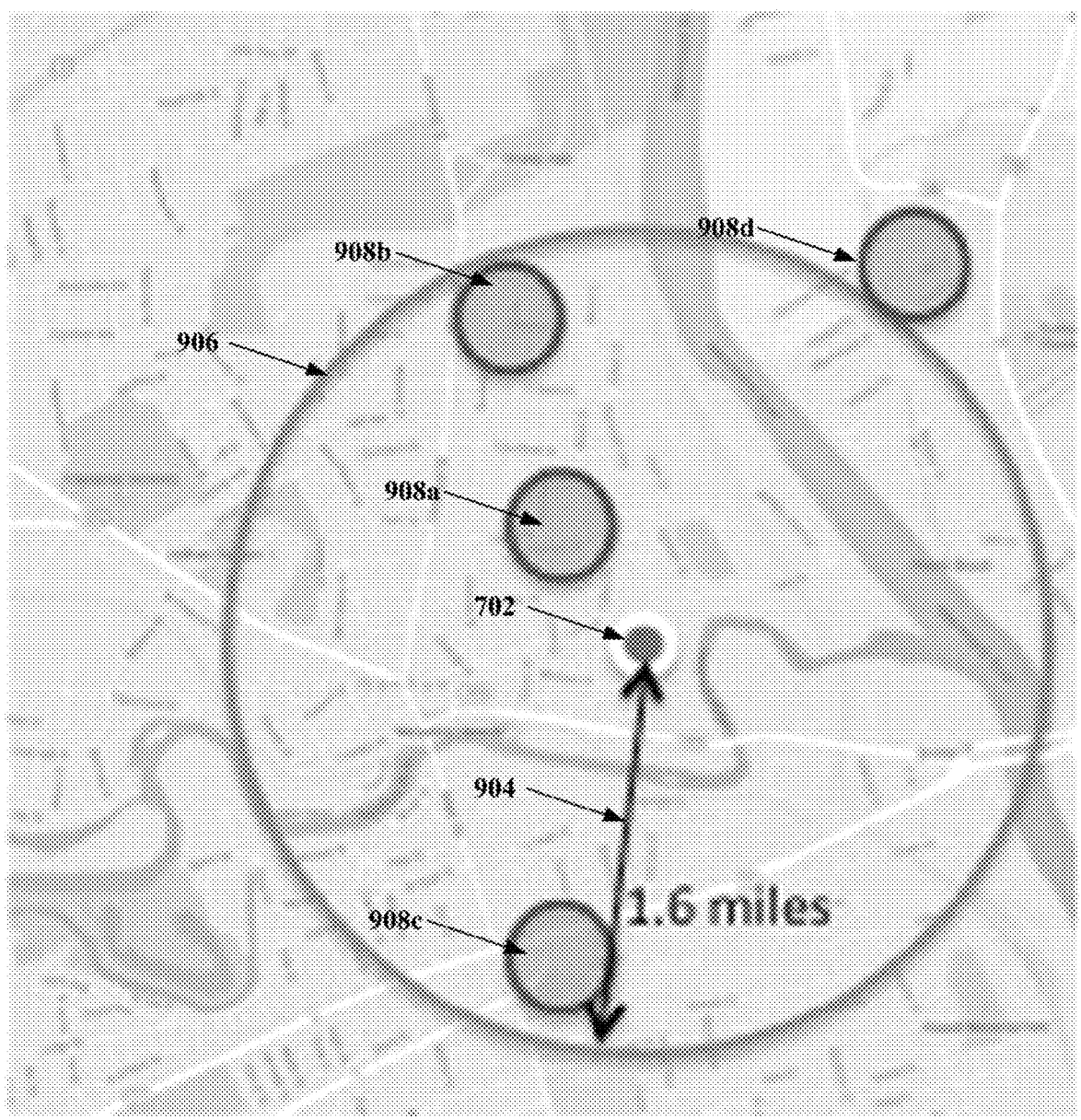

In FIG. 9, the mobile device has moved again. Upon exiting the personal region, the mobile device requested an update of the N closest regions based on the mobile device's new location. In this example, four regions 908*a*, 908*b* 908*c*, and 908*d* are returned with a new personal radius 904 of 1.6 miles. Thus, the personal region 906 is adjusted to a circle having a 1.6 miles radius surrounding the mobile device 702.

Figure 10:
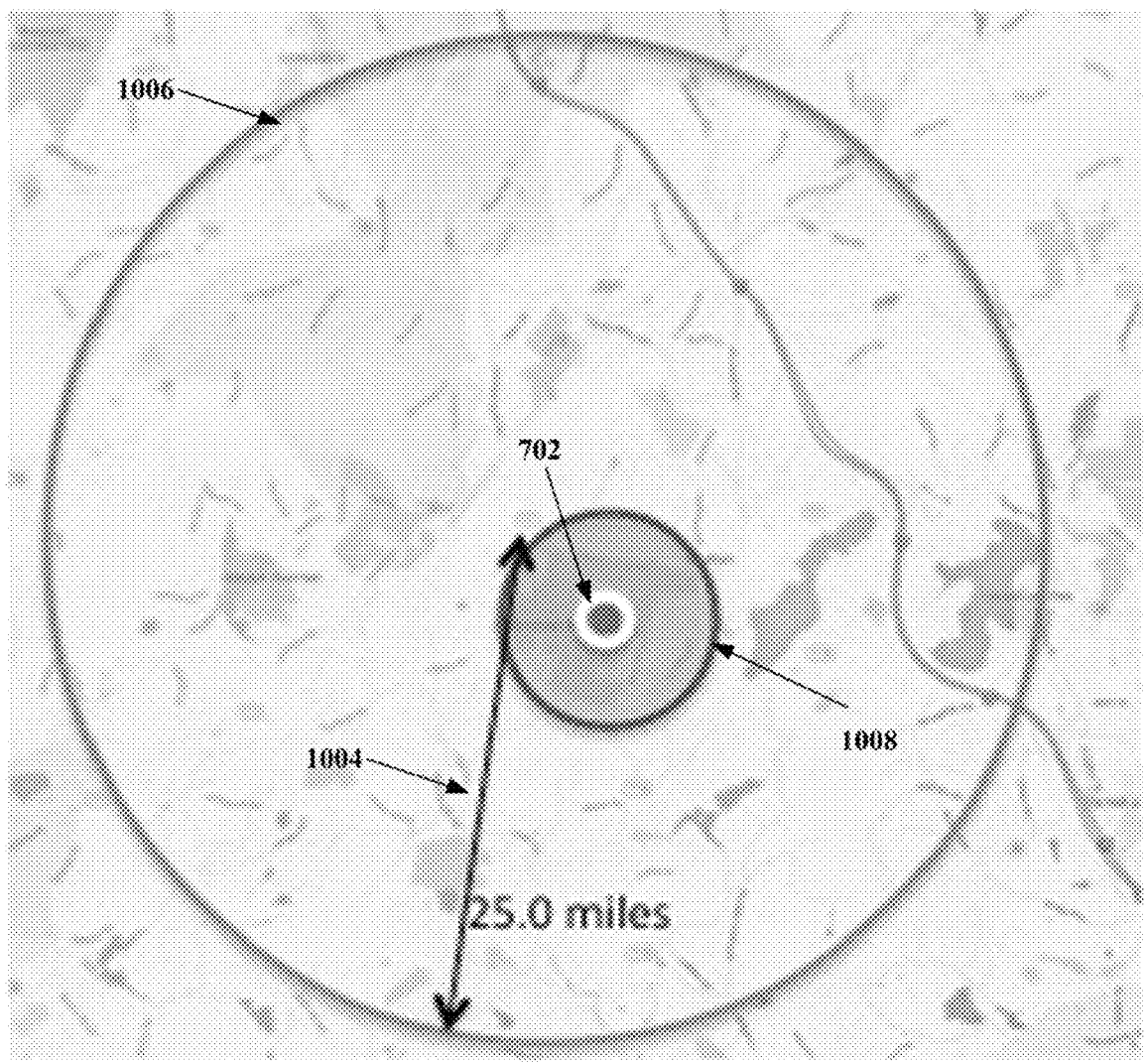

FIG. 10 shows that the mobile device 702 has moved again. Upon exiting the personal region, e.g., 706, 806, or 906, the mobile device requested an update of the N closest regions based on the mobile device's new location. In FIG. 10, only one region 1008 was returned with a new personal radius 1004 of 10 miles. Thus, the personal region 1006 is adjusted to a circle having a 10 miles radius surrounding the mobile device 702.

As illustrated in connection with FIGS. 7-10, the mobile device requests the closest N regions within radius R at 108. FIG. 1, in response to receiving the request at 108 from the mobile device, the web server retrieves N regions within a radius of R from the mobile device at 112. This may include, e.g., searching a list of regions previously identified by the mobile device or the web server as being of interest to the user of the mobile device. Other selection criteria may be employed by the mobile device, the mobile device application, the mobile device user, or the web server.

As a part of obtaining the N regions with a radius of the mobile device, the web server may determine at 114, whether there are more than N regions within a radius R of the mobile device. In one example, the web server may consider and return only regions having a radius larger than a minimum detection size of the mobile OS. This minimum detection size may set a threshold size above which the web server will consider the region for tracking. Thus, this minimum size may also be referred to herein as a threshold size. This minimum size may be, e.g., at least 150 meters. For example, if the mobile OS has a recommended minimum region radius of 150 meters, even though the Web Server may track and allow regions with smaller radii (down to 0 meters), only regions with radius of 150 meters and larger may be considered and returned to the mobile OS in step 114. When there are more than N regions within the radius R of the mobile device, the web server returns the N closest regions and an updated radius, R' to the mobile device at 116. The new radius R' is the distance to the farthest of the N regions returned to the mobile device. The new radius R' is also used to resize the personal region for the mobile device.

If there are not more than N regions within the radius R, the web server returns the N regions to the mobile device at 118.

If there are less than N regions within the radius R of the mobile device the web server returns all of the regions and returns an increased radius R to the mobile app, e.g., up to the configured maximum radius R to the mobile app.

Once the mobile device receives the N new regions to monitor, the mobile device sets up region monitoring on the N new regions at 120. As illustrated at 122, the regional monitoring is set up using a personal region based on the current location of the mobile device and the adjustable radius, R or R'. The radius is adjustable, because it may be the initial radius returned by the web server, or an updated radius provided by the web server, such as R'. The region monitoring may be set up, e.g., with the mobile OS by providing the N regions and the adjustable radius to the OS.

Once the region monitoring is set up, the mobile device waits at 124 to receive an event from the mobile OS.

FIG. 1 also illustrates examples of the mobile device receiving events from the OS.

In one example, at 126, the mobile device receives an enter region event from the OS for one of the N monitored regions. The corresponding region may be identified by the OS, e.g., by a region ID. The mobile device then obtains an enter message for that particular region ID from the web server at 128. The mobile device may transmit information relating to the event and region ID to a web server. Then, at 130, the web server transmits messages related to entering the identified region to the mobile device. The web server may also implement or trigger other services directly or indirectly with the mobile device or independent of the mobile device.

Once the mobile device receives the messages from the web server for the identified region, the mobile device notifies the corresponding application of the enter event received from the OS and message(s) received from the web server at 136. This allows the application to present such messages to the user via the mobile device.

Similarly at 132, the mobile device may device receive an exit region event from the OS for one of the N monitored regions, identified by a region ID. The mobile device then obtains an exit message for that particular region ID from the web server at 134. The mobile device may transmit information relating to the exit event and region ID to a web server. Then, at 130, the web server transmits message(s) relating to exiting the identified region to the mobile device. The web server may also implement or trigger other services directly or indirectly with the mobile device or independent of the mobile device.

Once the mobile device receives the messages from the web server for the identified region, the mobile device notifies the corresponding application of the exit event received from the OS and message(s) received from the web server at 138. This allows the application to present such location relevant messages to the user via the mobile device.

Among others, such messages might include advertisements, suggested activities, location specific safety warnings, business information such as restaurant menus, work order information, information about other application users near you, or public or private messages left by other application users.

Once the events and corresponding messages have been reported to the application, the mobile device waits at 124 to receive an event from the mobile OS.

In one example, once the web server receives the enter and the exit events from a mobile device for a certain region, it may calculate duration of being in the region (exit time minus enter time), and log activities and relevant data associated with the event, the device, and the region.

In one example, certain regions may include tracking the location of the device only while the device is within the region. For example, a user entering such a first 'location tracking' region may trigger the device and the web server to track the location of the device for the duration the device is within the 'location tracking' region. The location tracking may include battery saving aspects as described in more detail in connection with U.S. patent application Ser. No. 14/616,400, titled "Method for Optimizing Battery Use in a Mobile Device While Tracking a Location of the Device," and filed on Feb. 6, 2015, the entire contents of which are hereby incorporated by reference herein. For example, the first region may be a larger region or a geographic region, such as a city. Once a mobile enters that larger region, the mobile device may perform location tracking while the device is within the region. Location tracking may be used instead of region monitoring to determine that the device is within smaller regions contained within the larger region, such as specific venues, stores, points of interest, etc., within the city. Such smaller regions may have, e.g., a granular defined boundary, e.g., polygon associated with them instead of, or in conjunction with, a circular area with a defined radius This layered region monitoring may be enabled and disabled. Such enabling/disabling may be performed by a user of the mobile device, by an administrator associated with the larger region, automatically by the mobile device based on predetermined criteria, etc. When the layered region monitoring is enabled, once inside the particular larger region, the mobile device may perform region monitoring and/or location tracking for the smaller regions within the larger region. When the layered region monitoring is disabled, entering the larger region does not trigger location tracking of the smaller, contained, regions. Region monitoring with circular regions may still be used for the smaller, contained, regions.

Figure 11:
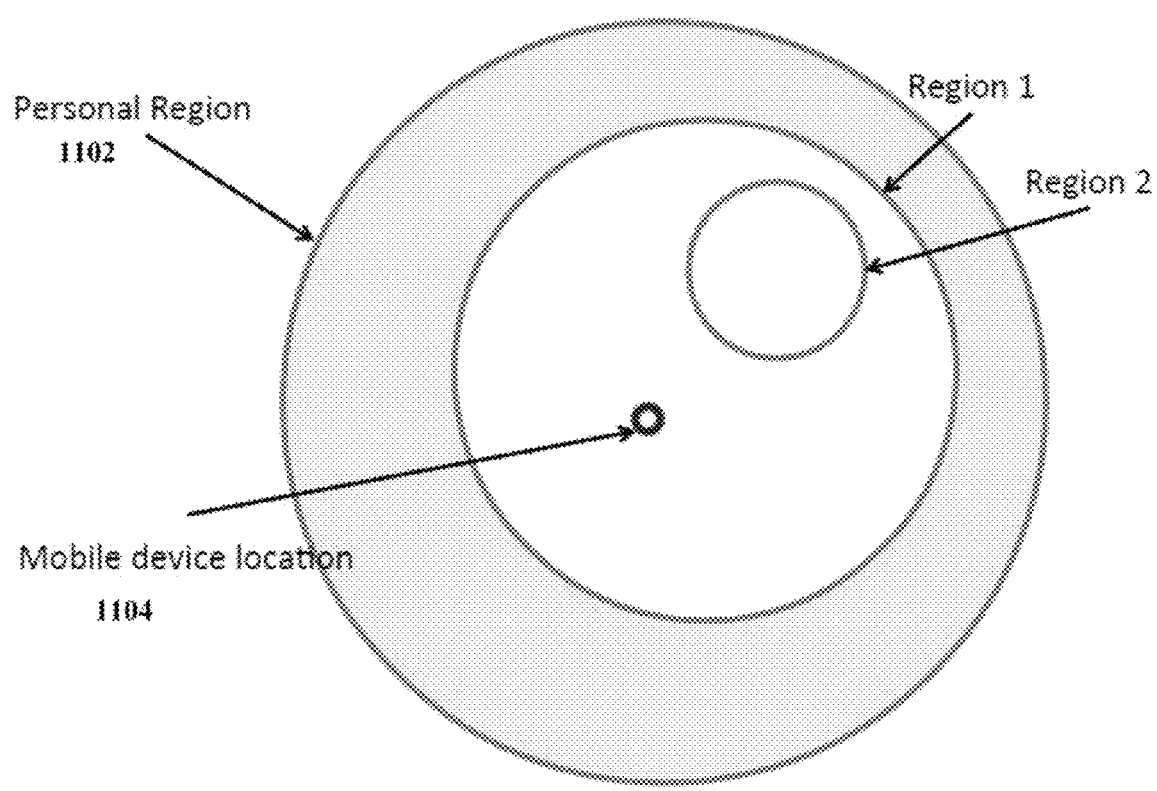
FIGS. 11-15 illustrate examples of larger regions containing smaller regions both circular in shape and of irregular shapes and how location monitoring may be used within larger regions, in accordance with aspects of the present invention.
Figure 12:
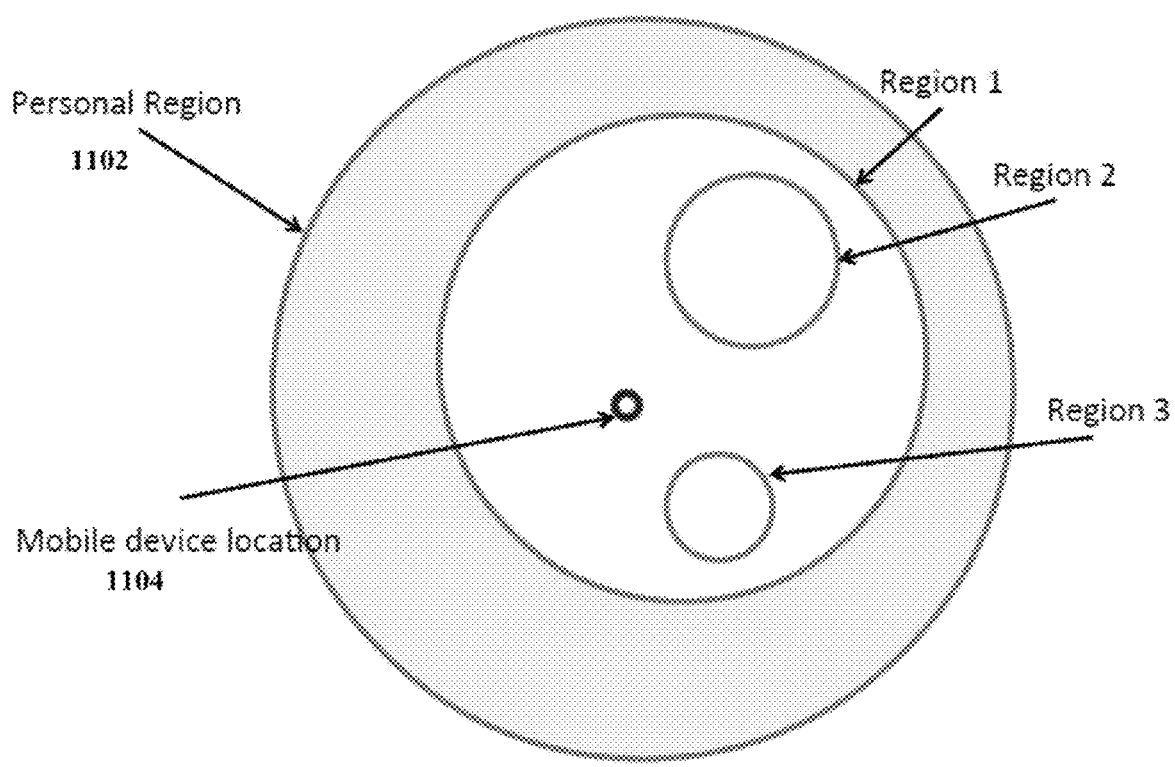
Figure 13:
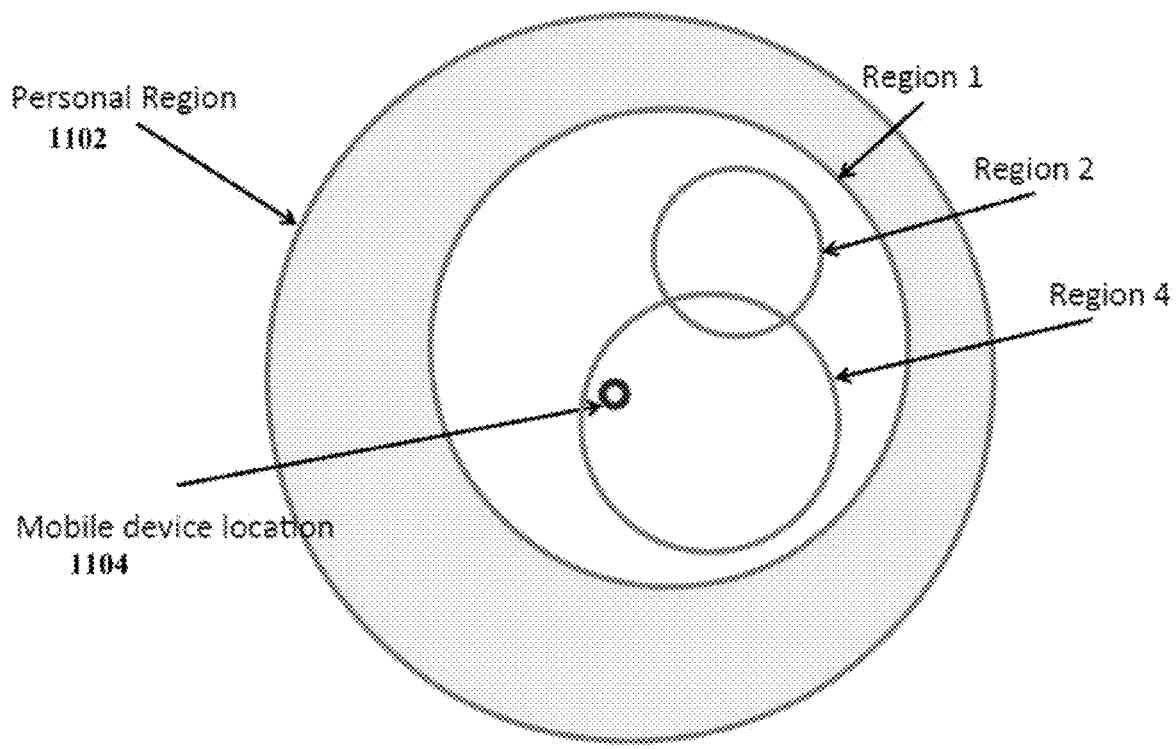
Figure 14:
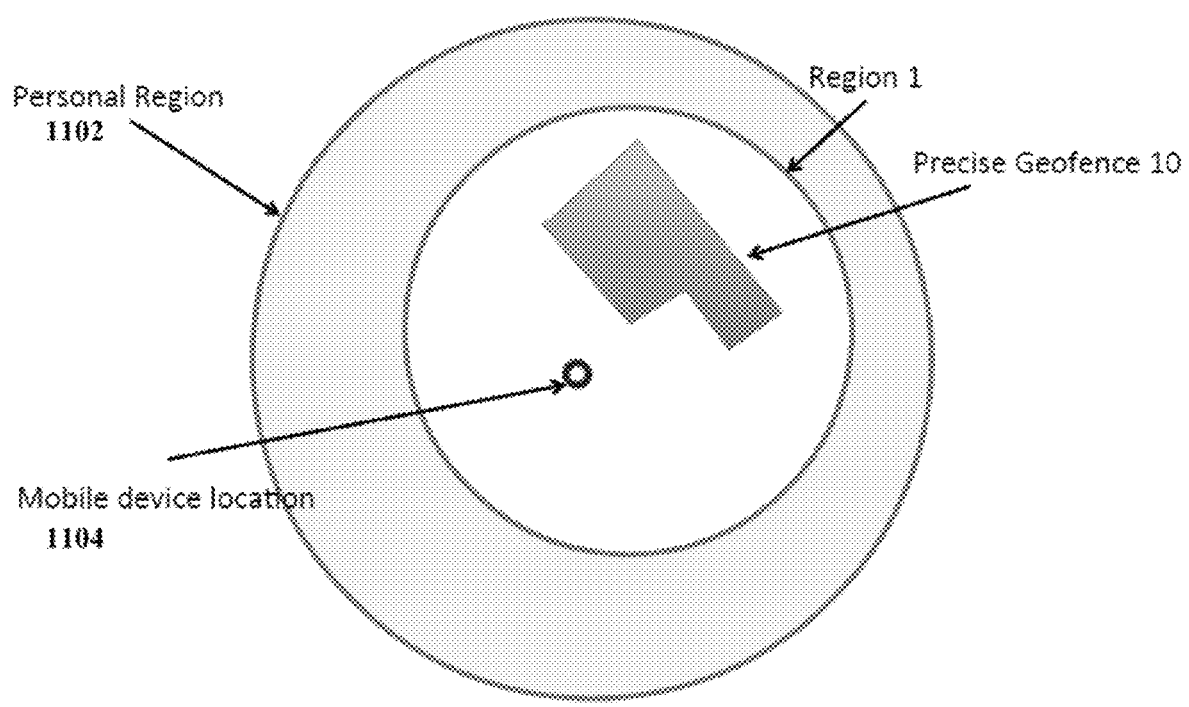
Figure 15:
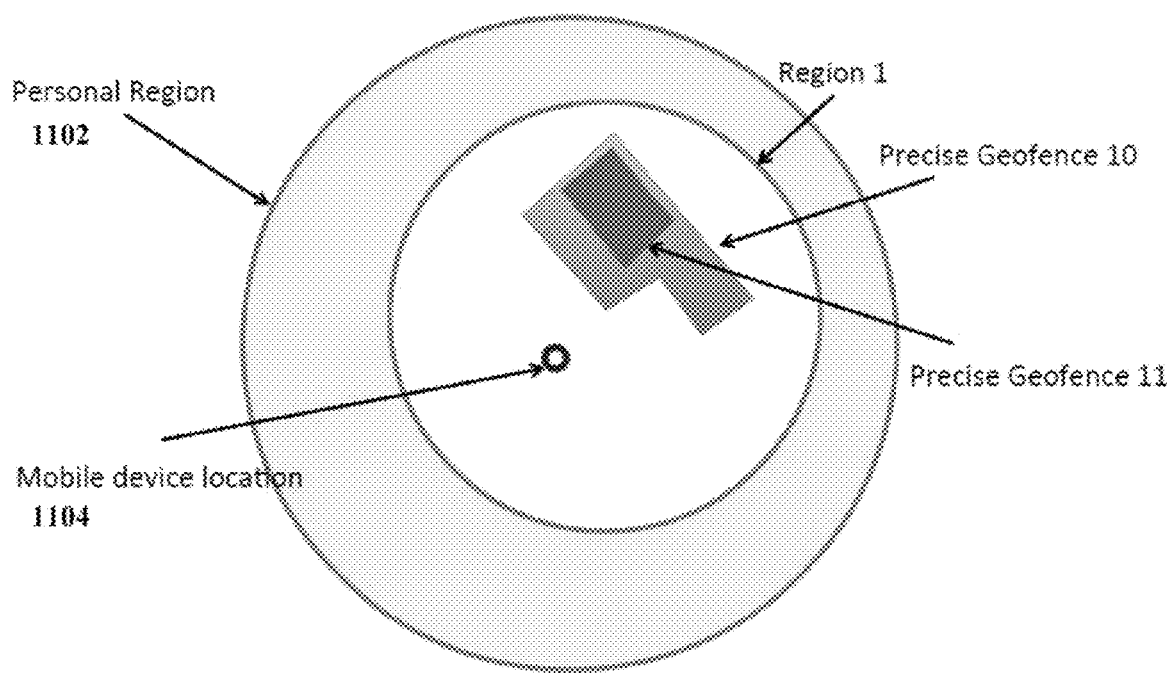

As illustrated in connection with FIGS. 11-15, a personal region 1102 may contain a large region, Region 1. In FIG. 11, Region 1 may contain smaller regions, e.g., Region 2. Once Region Monitoring is used to determine the Mobile device location 1104 is within Region 1, Location Monitoring may be used to determine if the device is within Region 2. As illustrated in FIG. 12, Location Tracking may be used, e.g., to determine if the device is within Region 2 or Region 3, both of which are within Region 1. As another example Location Tracking may be used, e.g., to determine whether the device is within both Region 2 and Region 4, as depicted in FIG. 13. In FIG. 14, Location Tracking may be used to determine if the mobile device is within the precise polygon defined region, e.g., such as Geofence 10. Region Monitoring may be limited to monitoring circular regions. In that circumstance, Geofence 10 may be monitored using Location Tracking. FIG. 15 depicts a Precise defined region, Precise Geofence 11, contained within Precise Geofence 10. Detecting the presence of the mobile device within one or both Precise Geofences may be done using Location Tracking since these two defined regions are not circular in shape. Once Region Monitoring has detected that the mobile device is within Region 1, the API may enable Location Tracking on the mobile device and with the web server, to determine when the mobile device enters Precise Region 10 and Precise Region 11.

The aspects described herein result in significant battery savings for establishing region monitoring within a mobile device application. For example, the use of a personal region around the mobile device to trigger web server communications to retrieve more regions and adaptively size the personal region, results in the successful ability for the algorithm to run on different mobile operating systems and effectively obey the constraints of all mobile operating systems while making efficient use of the battery. As well, these aspects may be performed in an anonymous manner.

Figure 2:
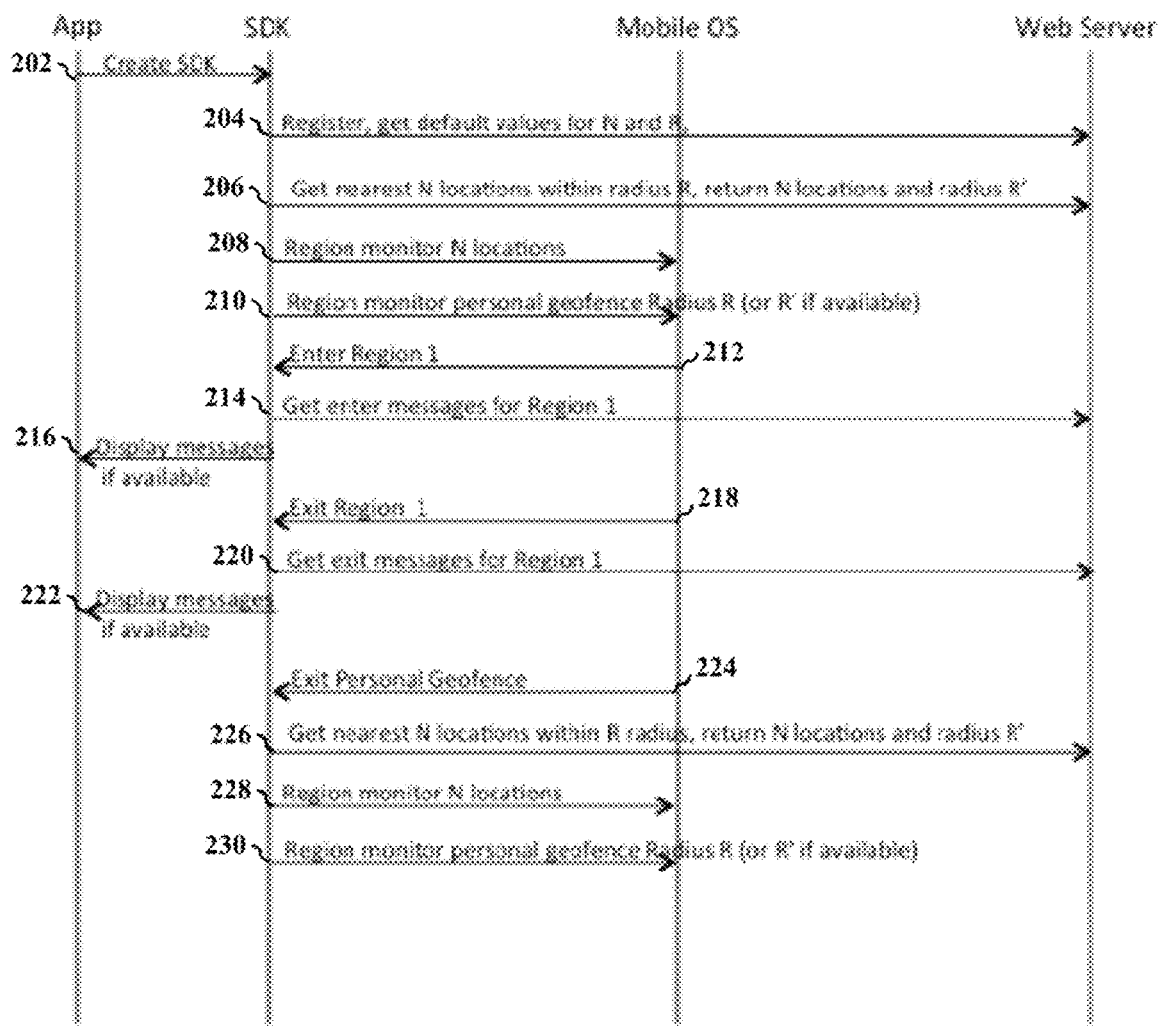
FIG. 2 is a flow diagram that illustrates example aspects of the flow of information between system components, in accordance with aspects of the present disclosure.

FIG. 2 illustrates an example conceptual data flow of information between the components involved in the flow chart of FIG. 1. The application in FIG. 2 may be a mobile device application that relies on the mobile device location service to monitor the identified regions of interest in relation to the location of the mobile device. The location service may be a component of the OS of the mobile device. The location service may monitor the location of the mobile device using, e.g., any of GPS, WiFi, and cellular tower triangulation. The web server may be a remote server that provides information for periodically adjusting the regions monitored by the mobile device and for providing messages or other services corresponding to events relating to the monitored regions. An API or web service may be used. In one example, an SDK may be used at the mobile device, e.g., embedded within one or more mobile applications, that enables applications on the mobile device to embed the technology to enable the mobile device to efficiently monitor regions. The SDK does this by being incorporated during development and compilation into the mobile application.

Once the mobile application is downloaded, the SDK or client-side API calls will execute the necessary code whenever the containing mobile application is started, or whenever the mobile device is powered on. A registration with a web server may provide the SDK or client-side API code with a GUID, which identifies that specific device of that specific mobile app. Any application can benefit from the aspects described herein.

Initially, at 202, the application creates an SDK or client-side API code. For example, the user of the smart phone may download and install an application with the SDK onto the smart phone. Although FIG. 2 illustrates an example in which an SDK is used, other APIs and web services may be used in connection with the aspects described herein.

The application registers the smart mobile phone with the web service, e.g., via SDK or client-side API code at 204. In response to the registration, the web service may return a default number of regions N and the default personal region radius R. Additionally, the web server may return the GUID to the mobile device application. The SDK or client-side API code may then communicate with the web server to retrieve N regions within a radius R for the mobile device to monitor. For example, the SDK or client-side API code may request the N nearest regions of interest identified by the user within a radius R of the mobile device at 206. The web server returns the N regions and possibly an adjusted radius R', if there were more or less than N regions identified within the previous radius. In one example, all of the regions returned by the web server may have individual radii equal to or larger than the recommended minimum region size, for example equal to or larger than 150 meters. Smaller regions may be defined and created on the Web Server, but to further increase battery efficiency, the mobile device region monitoring might not be performed on these small regions in this example. Then at 208, the SDK or client-side API code instructs the mobile OS to perform region monitoring of the N regions with respect to the location of the mobile device. The mobile device has a defined region, also referred to herein as a personal region. At 210, the SDK or client-side API code performs region monitoring for the defined region around the mobile device, as defined by an adjustable radius, e.g., R or R'. Periodically, the SDK or client-side API code within the app on the smart phone device may retrieve a new set of regions to monitor and a new radius less than or equal to the original default personal region radius R.

Region monitoring includes monitoring a location of the mobile device, as provided by a location service, such as the mobile device OS, with respect to the identified regions and/or personal region. The location monitoring may include battery saving aspects as described in more detail in connection with U.S. patent application Ser. No. 14/616,400, titled "Method for Optimizing Battery Use in a Mobile Device While Tracking a Location of the Device," and filed on Feb. 6, 2015, the entire contents of which are hereby incorporated by reference herein.

When an event occurs, such as the mobile device entering or exiting one of the monitored regions or the mobile device exiting the defined personal region, the OS informs the SDK or client-side API code. For example, at 212, the OS notifies the SDK that the mobile device has entered one of the regions. As described in connection with FIG. 1, the OS may identify the region by a region ID. At 212, the region is identified as Region 1. Then, at 214, the SDK or client-side API code requests and receives enter messages for Region 1. At 216, corresponding application displays the message to the user.

At 218, the OS notifies the SDK or client-side API code that the mobile device has exited Region 1. Then, at 220, the SDK or client-side API code requests and receives exit messages for Region 1. At 222, corresponding application displays the message to the user.

Another event that may occur is the mobile device exiting the defined region or personal region. When this occurs at 224, the SDK or client-side API code requests a new set of N regions within radius R. The web server returns the N (or fewer) regions and possibly an adjusted radius R', if there were more than N regions identified within the previous radius. Then, at 228, the SDK or client-side API code instructs the mobile OS to perform region monitoring for the N regions, and at 230 the SDK or client-side API code instructs the mobile OS to continue to perform region monitoring for the personal region corresponding to the mobile device. The radius of the personal region may be either R, the default radius, or R', the adjusted radius provided by the web server. The personal region is a circle having a radius R or R' surrounding a particular location of the mobile device. The personal region does not move to follow the mobile device while the device remains within the region, but is a static region once it is established, until the mobile device exits the personal region or another event triggers a request for a new set of regions and/or a new personal region radius. The SDK or client-side API code continues the region monitoring at 228 and 230 until an event occurs. Thus, the web server defines and updates the radius R that is used to identify the N regions and which is set as the radius of the personal region. The web server may update the radius based on the farthest of the N regions.

In order to provide for maximum battery life, the value of N may be selected to be very small, such as less than 10, less than 5, or approximately 4. Additionally, some mobile operating systems limit the total number of regions that the operating system will monitor. In order to manage the number of regions and stay below this system limit, the SDK and the web server may adaptively manage the regions closest to the current location of the mobile device. The SDK or client-side API code and the web server may use an adaptive, self-learning algorithm to ensure that the mobile device is always monitoring the N regions closest to the phone, while keeping N as small as possible.

Figure 3:
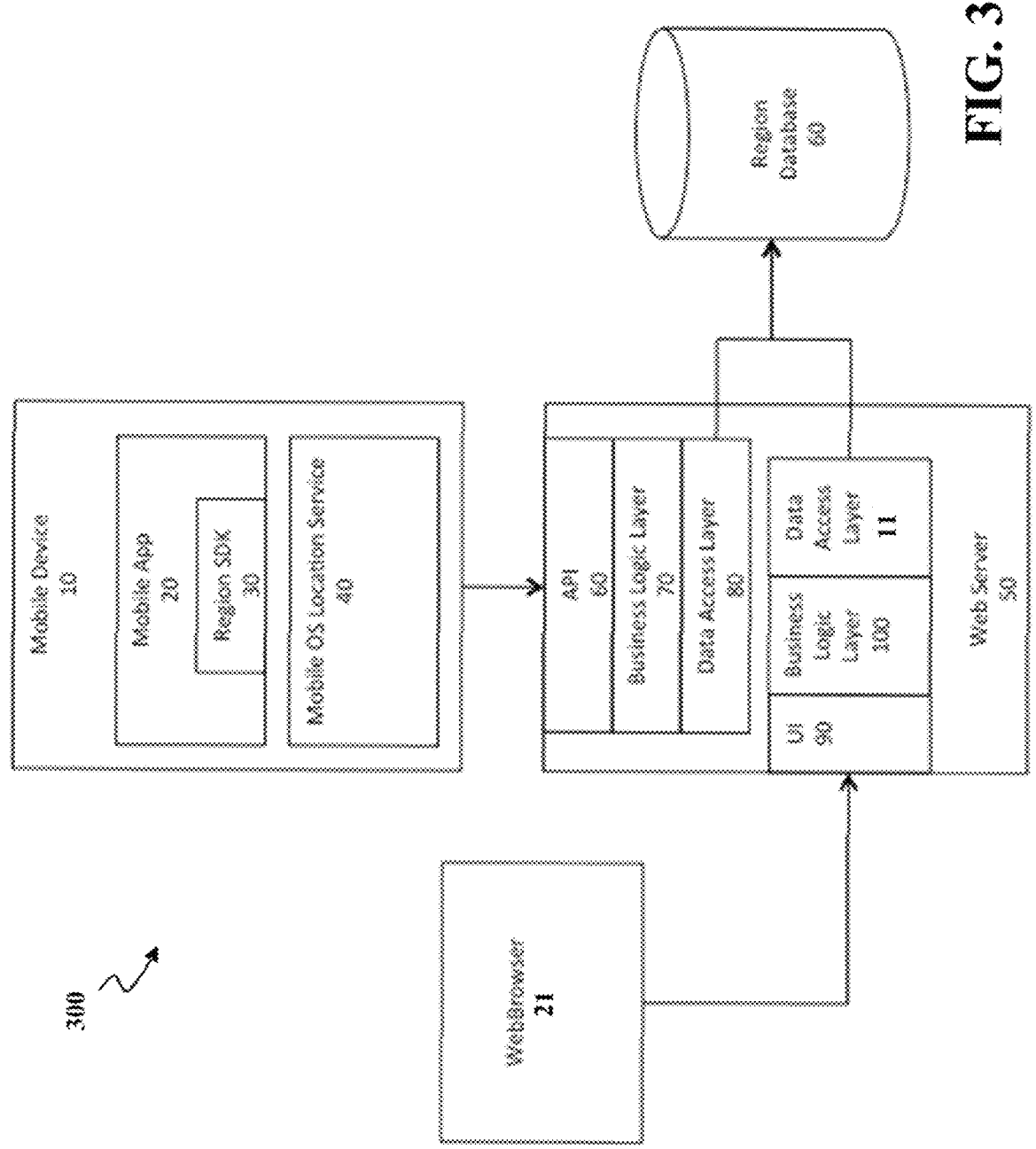
FIG. 3 is a diagram illustrating an example of system components, in accordance with aspects of the present disclosure.

FIG. 3 is a diagram illustrating an example system 300 for optimizing mobile device battery use and maximizing a possible number of regions to monitoring while performing region monitoring at a mobile device. The system includes a mobile device 10. Examples of mobile devices 10 include a cellular phone, a smart phone, a laptop, a personal digital assistant (PDA), a fitness band, a tablet, a multimedia device, a GPS system, a camera, an MP3 player, a mobile game console, or any other similar functioning mobile device that includes a location service capable of monitoring regions and discovering the location of the device.

Mobile device 10 includes a mobile application 20 downloaded on the mobile device, the application 20 having an SDK or client-side API code embedded therein in order to enable the adaptive region monitoring aspects described herein.

Mobile device 10 includes a location service 40 that determines a location of the device and is capable of monitoring regions. The location may be determined using any of GPS, cellular tower triangulation, and WiFi network location mapping. On a smart phone, for example, the location service 40 may be a component within the mobile OS. The location service 40 may report the determined location to other applications functioning on the mobile device 10, such as application 20. Such applications may include a location tracking application, or an application having a region of interest for which the application monitors the mobile device's presence relative to the region. For example, an OS may report a location of the device in latitude and longitude to the application 20 along with an estimated accuracy for the determined location. Additionally, the location service 40 may provide an indication about which source was used to determine the location. For example, the location may be provided with an indication that GPS information was used to obtain the location of the device.

The mobile device mobile device communication with a remote web server 50 in order to receive information about the regions that should be monitored and a region defined by an adjustable radius that should be monitored around the mobile device. Such communication may be generated at times by the application 20 or SDK 30.

The web server includes, e.g., an Application Program Interface (API) 60, business logic layer 70, data access layer 80 configured to receive and process the communication from the mobile device and process. Such communication may include registration and requests for default N and R values, requests for the nearest N regions to monitor, notification of events such as entering a monitored region, and exiting a personal region. Additionally, these components of the server process and prepare communication to be transmitted to the mobile device, such as transmitting a default N and R value, transmitting N regions to be monitored, transmitting messages related to an enter/exit event, and transmitting an adjusted radius R for the personal region. Web server also includes business logic layer 100 and data access layer 11 that provide the capability to retrieve regions and messages for the mobile applications and dynamically adjust the radius of the personal geofence. The web server includes a user interface (UI) that can be accessed, e.g., via a web browser 21. The user interface allows information to be entered into the web browser, such as adjustment of default N and R values, create and delete regions, create and delete region hierarchies which may be based on geography, create and delete messages, and modify and update messages corresponding to various regions. Web server may also include or be operatively coupled to a region database 60 that stores the identified regions. The regions may be identified, e.g., by a region ID. Each region may be stored in connection with their physical location, e.g., in latitude and longitude. Additionally, messages may be stored in connection with each region, the messages identified as corresponding to enter events, exit events, or other events.

The aspects presented herein result in significantly reduced battery usage by the mobile device while providing region monitoring. There may be limitations on the number of regions that a user can enter into an OS for region monitoring. For example, an OS might limit the user to 20 regions. Even though a user may be able to enter 20 regions, monitoring more than around 10 might cause a significant drain on the battery. Other systems might avoid the potential drain on the battery by limiting the number of regions that can be monitored to a number below 10. The aspects presented in this application overcome such drawbacks by allowing the user to perform region monitoring without limitation on the number of regions that can be entered by the user. Additionally, the aspects minimize battery use caused by the region monitoring because only a small number of regions are being monitored at any given time, based on a selected number N of regions closest to the mobile device. The regions being monitored may be continually updated as the mobile device moves. Also, the defined region or personal region of the mobile device may be adjusted based on the farthest monitored region.

Figure 4:
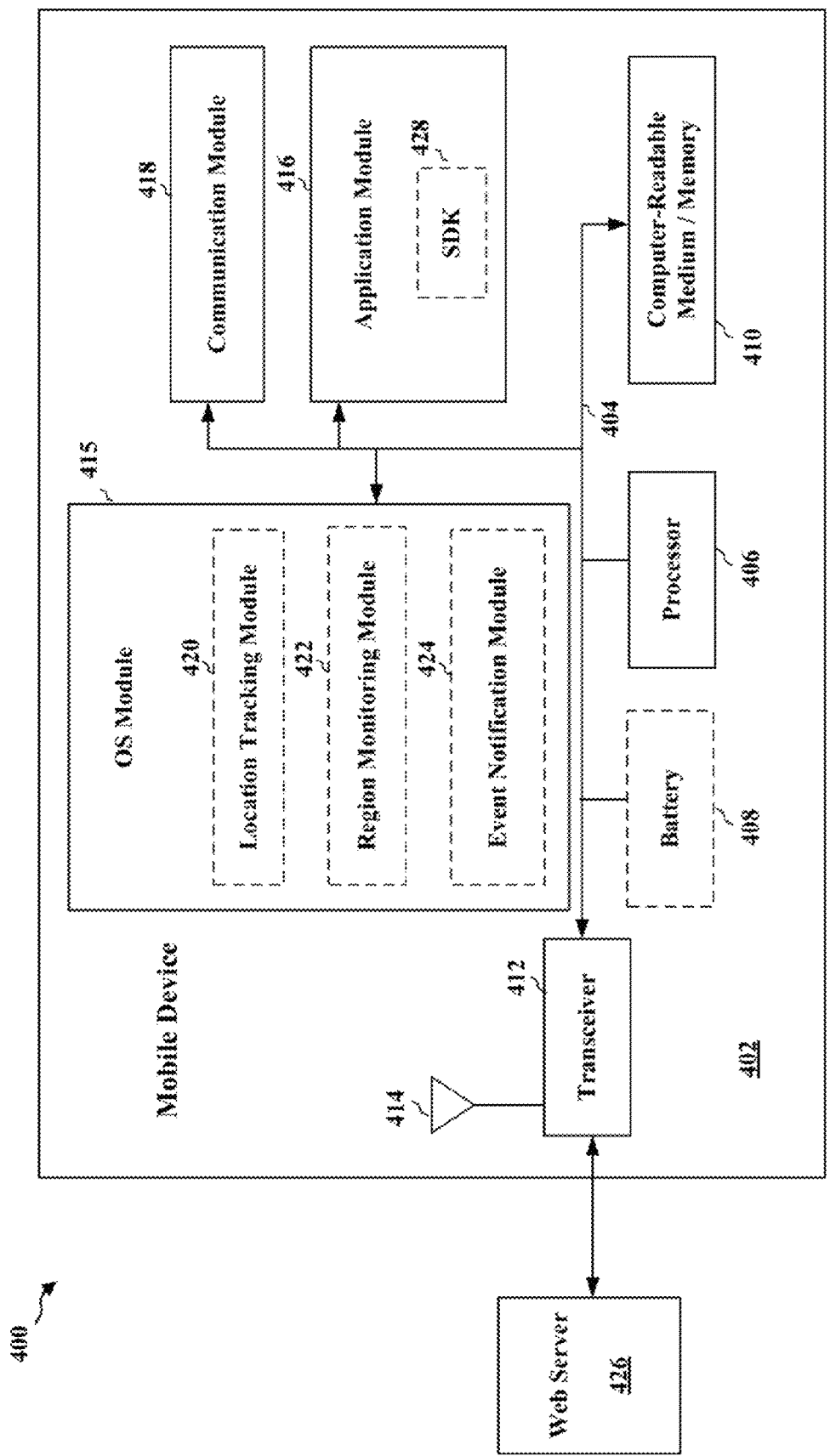
FIG. 4 illustrates components of an example mobile device, in accordance with aspects of the present disclosure.

FIG. 4 is a diagram 400 illustrating example aspects of a hardware implementation of a mobile device 402 employing a processing system.

Such a processing system may comprise various circuits including one or more processors and/or modules, represented by the processor 406, the modules 415, 416, 418, 420, 422, and 424, computer-readable medium/memory 410, and battery 408, linked to each other by a bus 404. The bus 402 may link various other circuits which are not described in detail.

The mobile apparatus may comprise a transceiver 412 coupled to the processing system. The transceiver 412 may be coupled to one or more antennas 414 in order to provide a means for communicating with various other apparatus over a transmission medium. For example, the transceiver may be used to transmit the registration and requests for default N and R values, requests for the nearest N regions to monitor, notification of events such as entering a monitored region, and exiting a personal region, in connection with application 416 and SDK 428, to a remote web server 426. Such communication may be performed wirelessly, such as using a cellular network and Wi-Fi, among others. The transceiver 412 may be configured to both receive and process signals, e.g., including signals from a web server such as 426, and to provide information from the signal to the processing system, e.g., to communication module. For example, the transceiver may receive communication from the web server 426, such as, a default N and R value, N regions to be monitored, messages related to an enter/exit event, and an adjusted radius R for the personal region. Communication module 418 may then provide the information to the application module or to another application module.

Processor 406 may be configured for general processing, including the execution of software stored on the computer-readable medium/memory 410. Such software, when executed by the processor 406, may cause the processing system to perform the various functions described supra.

The processing system further includes at least one of the modules 415, 416, 418, 420, 422, and 424. For example, the OS 415 of the mobile device may comprise, e.g., a location service module 420 to determine the location of the mobile device, e.g., using any of GPS, WiFi network location mapping module 424, cellular triangulation, in order to determine location updates that can be communicated to application module 416, as described supra. Additionally, OS 415 may include a region monitoring module 422 that performs region monitoring of N regions within a radius R of the mobile device, as instructed by the application(s) downloaded on the mobile device. The OS may further include an event notification module 424 that notifies application(s) or SDK when region enter events, region exit events, and personal region exit events occur. The modules may be software modules running in the processor 406, resident/stored in the computer readable medium/memory 410, one or more hardware modules coupled to the processor 406, or some combination thereof. In one example, mobile device may be a smart phone or other smart device.

Figure 5:
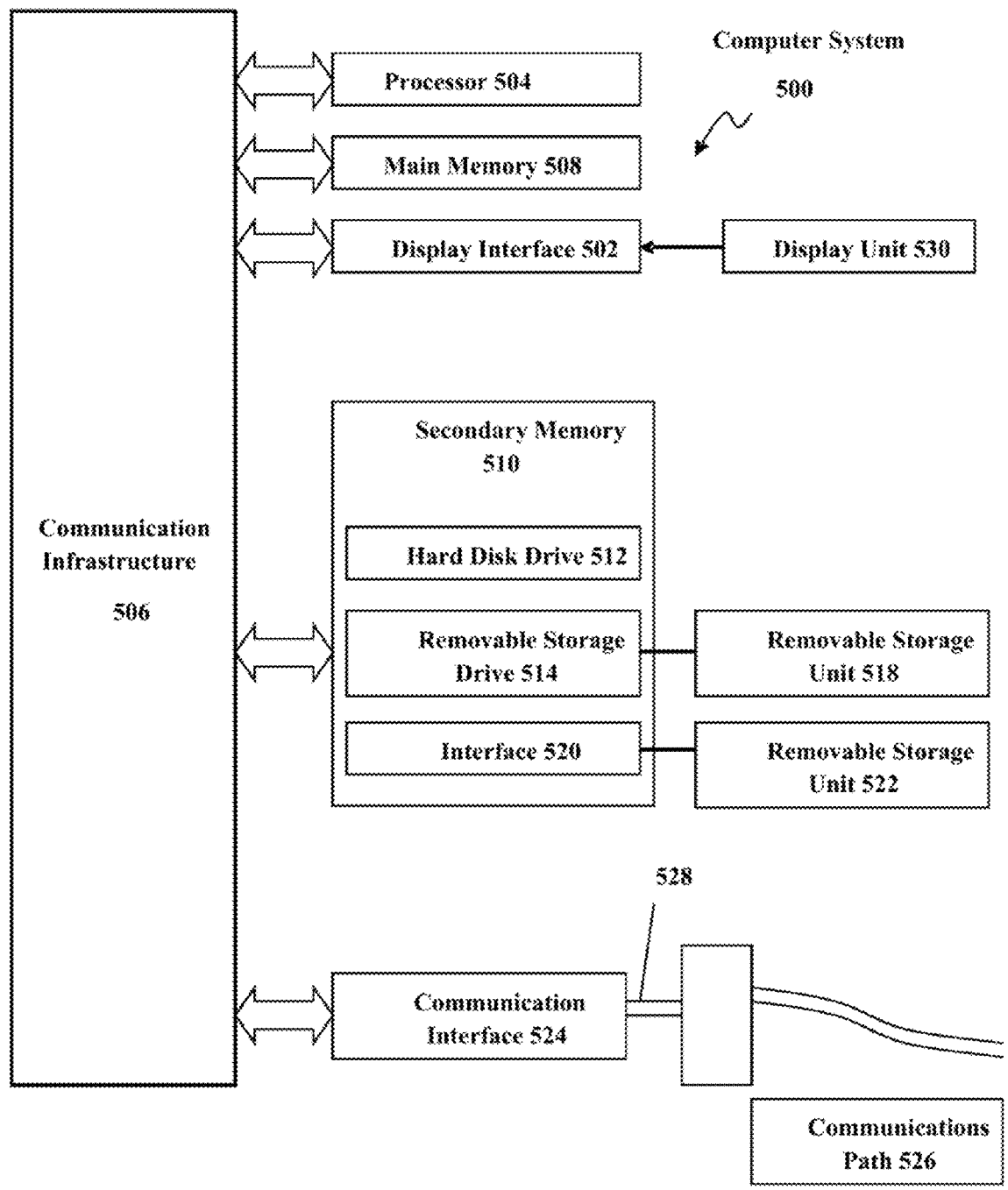
FIG. 5 illustrates an example system diagram of various hardware components and other features, for use in accordance with aspects of the present disclosure.

FIG. 5 presents an example system diagram of various hardware components and other features, for use in accordance with aspects presented herein. The aspects may be implemented using hardware, software, or a combination thereof and may be implemented in one or more computer systems or other processing systems. In one example, the aspects may include one or more computer systems capable of carrying out the functionality described herein. An example of such a computer system 500 is shown in FIG. 5.

Computer system 500 includes one or more processors, such as processor 504. The processor 504 is connected to a communication infrastructure 506 (e.g., a communications bus, cross-over bar, or network). Various software aspects are described in terms of this example computer system. After reading this description, it will become apparent to a person skilled in the relevant art(s) how to implement the aspects presented herein using other computer systems and/or architectures.

Computer system 500 can include a display interface 502 that forwards graphics, text, and other data from the communication infrastructure 506 (or from a frame buffer not shown) for display on a display unit 530. Computer system 500 also includes a main memory 508, preferably random access memory (RAM), and may also include a secondary memory 510. The secondary memory 510 may include, for example, a hard disk drive 512 and/or a removable storage drive 514, representing a floppy disk drive, a magnetic tape drive, an optical disk drive, etc. The removable storage drive 514 reads from and/or writes to a removable storage unit 518 in a well-known manner. Removable storage unit 518, represents a floppy disk, magnetic tape, optical disk, etc., which is read by and written to removable storage drive 514. As will be appreciated, the removable storage unit 518 includes a computer usable storage medium having stored therein computer software and/or data.

In alternative aspects, secondary memory 510 may include other similar devices for allowing computer programs or other instructions to be loaded into computer system 500. Such devices may include, for example, a removable storage unit 522 and an interface 520. Examples of such may include a program cartridge and cartridge interface (such as that found in video game devices), a removable memory chip (such as an erasable programmable read only memory (EPROM), or programmable read only memory (PROM)) and associated socket, and other removable storage units 522 and interfaces 520, which allow software and data to be transferred from the removable storage unit 522 to computer system 500.

Computer system 500 may also include a communications interface 524. Communications interface 524 allows software and data to be transferred between computer system 500 and external devices. Examples of communications interface 524 may include a modem, a network interface (such as an Ethernet card), a communications port, a Personal Computer Memory Card International Association (PCMCIA) slot and card, etc. Software and data transferred via communications interface 524 are in the form of signals 528, which may be electronic, electromagnetic, optical or other signals capable of being received by communications interface 524. These signals 528 are provided to communications interface 524 via a communications path (e.g., channel) 526. This path 526 carries signals 528 and may be implemented using wire or cable, fiber optics, a telephone line, a cellular link, a radio frequency (RF) link and/or other communications channels. In this document, the terms "computer program medium" and "computer usable medium" are used to refer generally to media such as a removable storage drive 980, a hard disk installed in hard disk drive 970, and signals 528. These computer program products provide software to the computer system 500. Aspects presented herein may include such computer program products.

Computer programs (also referred to as computer control logic) are stored in main memory 508 and/or secondary memory 510. Computer programs may also be received via communications interface 524. Such computer programs, when executed, enable the computer system 500 to perform the features presented herein, as discussed herein. In particular, the computer programs, when executed, enable the processor 510 to perform the features presented herein. Accordingly, such computer programs represent controllers of the computer system 500.

In aspects implemented using software, the software may be stored in a computer program product and loaded into computer system 500 using removable storage drive 514, hard drive 512, or communications interface 520. The control logic (software), when executed by the processor 504, causes the processor 504 to perform the functions as described herein.

In another example, aspects may be implemented primarily in hardware using, for example, hardware components, such as application specific integrated circuits (ASICs). Implementation of the hardware state machine so as to perform the functions described herein will be apparent to persons skilled in the relevant art(s).

In yet another example, aspects presented herein may be implemented using a combination of both hardware and software.

Figure 6:
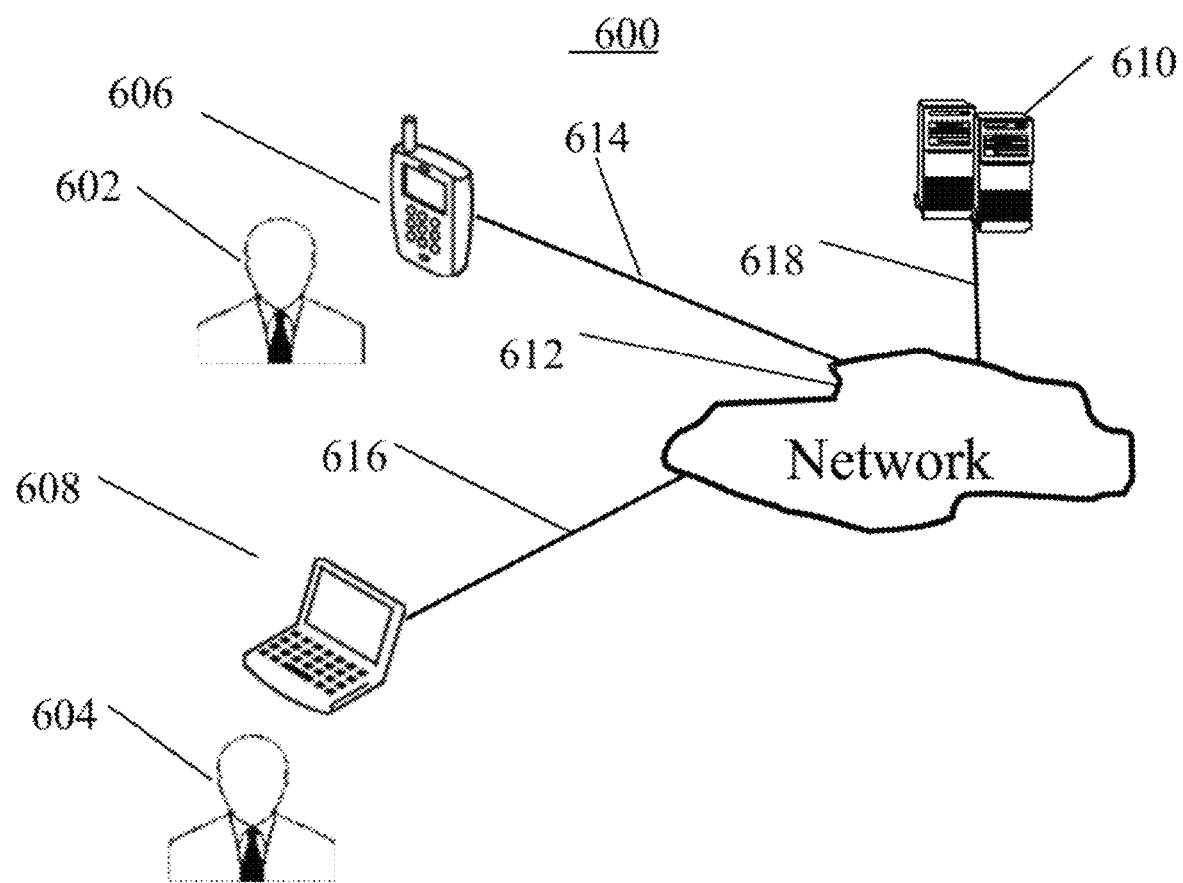
FIG. 6 illustrates a block diagram of various example system components, in accordance with aspects of the present disclosure.

FIG. 6 is a block diagram of various example system components, in an example communication system 600 usable in accordance with aspects presented herein. The communication system 600 includes one or more accessors 602 and 604 (also referred to interchangeably herein as one or more "users") and one or more terminals 606, 608. In one aspect, data for use in accordance aspects presented herein, for example, may be input and/or accessed by accessors 602, 604 via terminals 606, 608, such as telephonic devices, smart devices, wireless devices, such as personal digital assistants ("PDAs") or a hand-held wireless devices coupled to a server 610, such as a PC, minicomputer, mainframe computer, microcomputer, or other device having a processor and a repository for data and/or connection to a repository for data, via, for example, a network 612, such as the Internet or an intranet, and couplings 614, 616, and 618. The couplings 614, 616, and 618 may include, for example, wired, wireless, or fiber optic links. For example, a wireless coupling may comprise a cellular communication link (3G, 4G, LTE or future cellular protocol) or Wi-Fi connection.

Example aspects of the present invention have now been described in accordance with the above advantages. It will be appreciated that these examples are merely illustrative of aspects of the present invention. Many variations and modifications will be apparent to those skilled in the art.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects." Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of reducing battery consumption while performing region monitoring at a mobile device, wherein the mobile device is capable of performing location tracking of the mobile device and region monitoring of a location of the mobile device relative to a plurality of defined regions, comprising:
    transmitting a first request, to a web server for a number, N, of the plurality of defined regions for region monitoring, wherein the N defined regions are a subset of the plurality of defined regions having a smallest distance from within a circle of a first personal region radius centered at a location of the mobile device at the time of the request, wherein each of the defined regions comprises a circular area defined by a corresponding radius surrounding a corresponding latitude and longitude;
    receiving at most a subset of N closest defined regions having a minimum size and a second personal region radius, from the web server, wherein a first personal region comprises an area of a circle having the second personal region radius and centered at the location of the mobile device at the time of the first request;
    monitoring an updated location of the mobile device with respect to the first personal region;
    performing region monitoring of the received subset of N regions;
    determining that the mobile device exits the first personal region;
    when it is determined that the mobile device exits the first personal region, transmitting a second request to the web server for an update of the subset of N regions for which region monitoring should be performed;
    receiving a second subset of N closest defined regions having a minimum size and a third personal region radius, from the web server, wherein a second personal region comprises an area of a second circle having the third personal region radius and centered at the location of the mobile device at the time of the second request;
    monitoring an updated location of the mobile device with respect to the second personal region; and
    performing region monitoring of the received second subset of N regions.

2. The method of claim 1, further comprising:
    receiving a default number of regions for region monitoring and a default personal radius size R from the web server prior to transmitting the first request.

3. The method of claim 1, wherein the first personal region radius and the second personal region radius are the same.

4. The method of claim 1, wherein the second personal region radius is different from the first personal region radius, the second personal region radius being based on the distance to the farthest region of the subset of N defined regions to be monitored.

5. The method of claim 1, wherein location information is transmitted from the mobile device to the web server using an anonymous token to identify the mobile device.

6. A mobile device having reduced battery consumption while performing region monitoring, wherein the mobile device is capable of performing location tracking of the mobile device and region monitoring of a location of the mobile device relative to a plurality of defined regions, comprising:
    a memory; and
    at least one processor coupled to the memory and configured to:
        transmit a first request to a web server for a number, N, of the plurality of defined regions for region monitoring, wherein the N defined regions are a subset of the plurality of defined regions having a smallest distance from within a circle of a first personal region radius centered at a location of the mobile device at the time of the request, wherein each of the defined regions comprises a circular area defined by a corresponding radius surrounding a corresponding latitude and longitude;
        receive at most a subset of N closest defined regions having a minimum size and a second personal region radius, from the web server, wherein a first personal region comprises an area of a circle having the second personal region radius and centered at the location of the mobile device at the time of the request;
monitor an updated location of the mobile device with respect to the first personal region;
perform region monitoring of the received subset of N regions;
determine that the mobile device exits the first personal region;
when it is determined that the mobile device exits the first personal region, transmit a second request to the web server for an update of the subset of N regions for which region monitoring should be performed;
receive a second subset of N closest defined regions having a minimum size and a third personal region radius, from the web server, wherein a second personal region comprises an area of a second circle having the third personal region radius and centered at the location of the mobile device at the time of the second request;
monitor an updated location of the mobile device with respect to the second personal region; and
perform region monitoring of the received second subset of N regions.

7. The mobile device of claim 6, wherein the mobile device is configured to request region information from the web server using an anonymous token to identify the mobile device.

8. A non-transitory computer-readable medium storing computer executable code for reducing battery consumption while managing regions being monitored by a mobile device, wherein the mobile device is capable of performing location tracking of the mobile device and region monitoring of a location of the mobile device relative to a plurality of defined regions, comprising code for:
transmitting a first request, to a web server for a number, N, of the plurality of defined regions for region monitoring, wherein the N defined regions are a subset of the plurality of defined regions having a smallest distance from within a circle of a first personal region radius centered at a location of the mobile device at the time of the request, wherein each of the defined regions comprises a circular area defined by a corresponding radius surrounding a corresponding latitude and longitude;
receiving at most a subset of N closest defined regions having a minimum size and a second personal region radius, from the web server, wherein a first personal region comprises an area of a circle having the second personal region radius and centered at the location of the mobile device at the time of the first request;
monitoring an updated location of the mobile device with respect to the first personal region;
performing region monitoring of the received subset of N regions;
determining that the mobile device exits the first personal region;
when it is determined that the mobile device exits the first personal region, transmitting a second request to the web server for an update of the subset of N regions for which region monitoring should be performed;
receiving a second subset of N closest defined regions having a minimum size and a third personal region radius, from the web server, wherein a second personal region comprises an area of a second circle having the third personal region radius and centered at the location of the mobile device at the time of the second request;
monitoring an updated location of the mobile device with respect to the second personal region; and
performing region monitoring of the received second subset of N regions.

9. The computer program product of claim 8, wherein location information is transmitted from the mobile device to the web server using an anonymous token to identify the mobile device.

10. The method of claim 1, further comprising:
performing region monitoring for the mobile device with respect to a first defined region; and
when it is determined that the mobile device enters the first defined region, triggering monitoring of a smaller location within the first defined region.

11. The method of claim 10, wherein the monitoring that is triggered comprises region monitoring for the mobile device with respect to the smaller location within the first defined region.

12. The method of claim 10, wherein the monitoring that is triggered comprises location tracking for the smaller location within the first defined region.

13. The method of claim 12, wherein the first defined region comprises a first circular area, and wherein the smaller location comprises a polygonal shaped boundary.

14. The method of claim 1, wherein the area of the first personal region comprises a fixed location based on the second personal region radius and the location of the mobile device at the time of the request.

15. The method of claim 1, wherein an operating system of the mobile device limits a number and size of regions for which region monitoring can be simultaneously performed.

16. The method of claim 1, wherein the requesting the subset of the plurality of defined regions for region monitoring is initiated by a mobile application of the mobile device.

17. The method of claim 1, wherein the plurality of defined regions are each created by a mobile device user through an application user interface based on a location of the mobile device user, and wherein the web server makes the plurality of defined regions available for region monitoring to other mobile devices.

18. The method of claim 1, wherein the plurality of defined regions are each created via at least one of a user interface of the web server, a machine to machine interface via an application program interface (API) of the web server, or via a data import of a comma separated value file.

* * * * *